Aug. 1, 1961    C. E. PLUMMER, JR    2,994,542
TANK RESERVE VALVE RESETTING MEANS
Filed Feb. 11, 1958    2 Sheets-Sheet 1
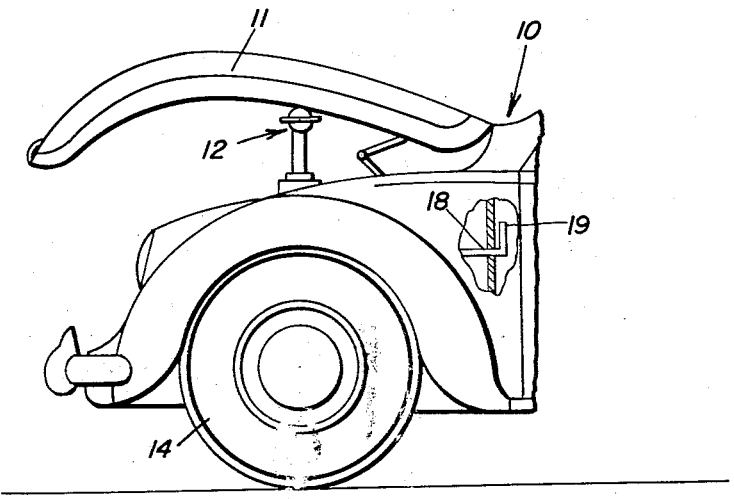
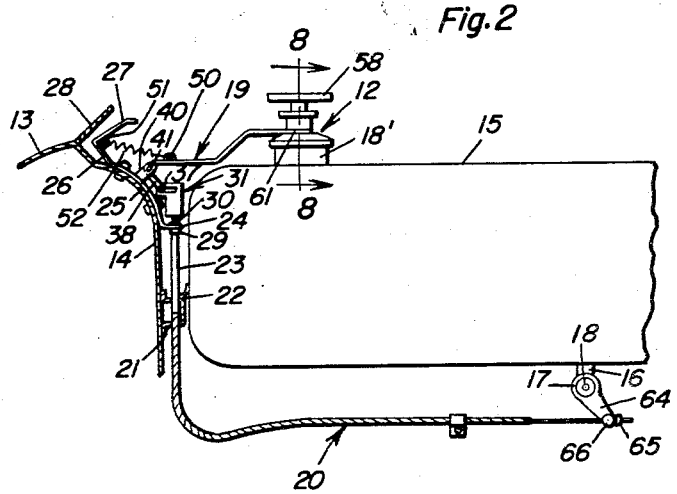
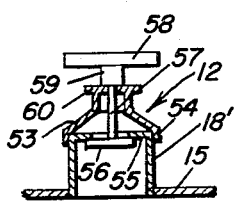
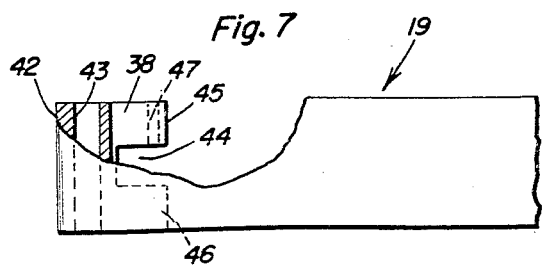
Clifford E. Plummer, Jr.
INVENTOR.

Aug. 1, 1961 C. E. PLUMMER, JR 2,994,542
TANK RESERVE VALVE RESETTING MEANS
Filed Feb. 11, 1958 2 Sheets-Sheet 2
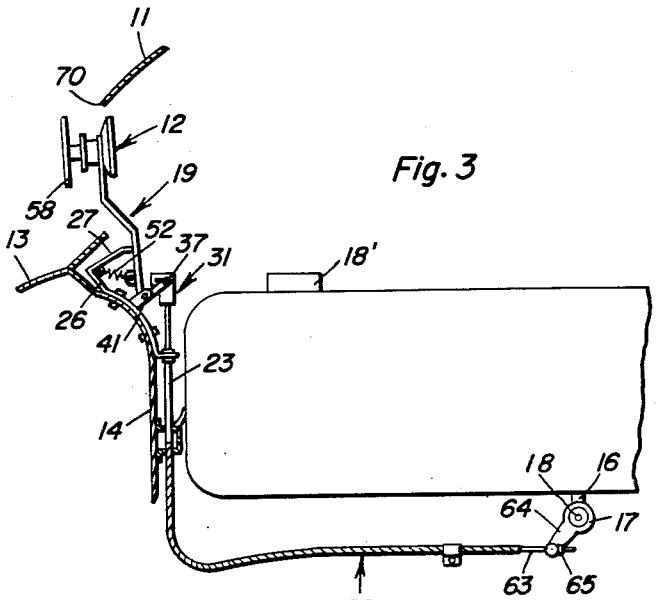
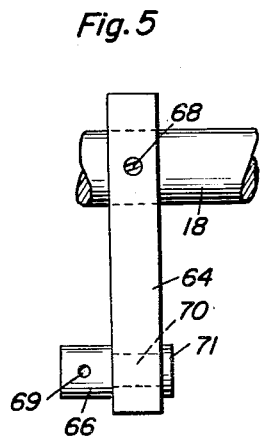
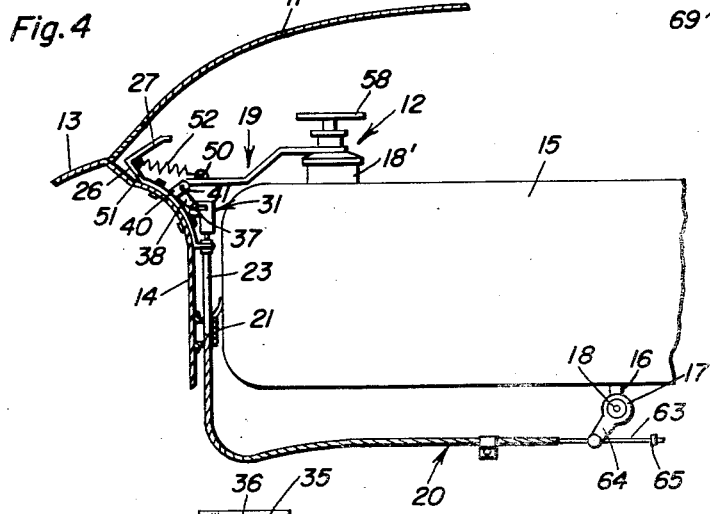
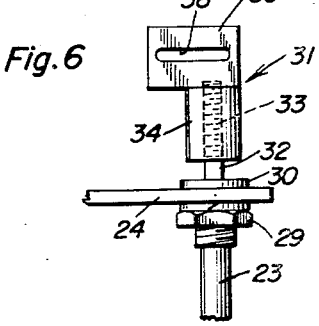
Clifford E. Plummer, Jr.
INVENTOR.

United States Patent Office 2,994,542
Patented Aug. 1, 1961

2,994,542
TANK RESERVE VALVE RESETTING MEANS
Clifford E. Plummer, Jr., San Bruno, Calif.
(957 Edmonds Way, Sunnyvale, Calif.)
Filed Feb. 11, 1958, Ser. No. 714,556
8 Claims. (Cl. 280—5)

This invention relates in general to attachments for automotive vehicles and pertains more particularly to a fuel tank valve control attachment for resetting the valve from the reserve position to the normal position when the fuel tank is filled.

Certain automobiles presently on the market utilize, in the fuel system, a supply tank having an outlet containing a control valve. The control valve is movable between a reserve position and a normal position and as well may be movable to a shut-off position for the purpose of controlling the supply from the tank to the carburetor or carburetors of a vehicle. In some cases, the valve operates in lieu of a fuel gauge, the theory being that the driver will operate the vehicle with the valve in the normal position until such time as he runs out of gas at which time the valve is switched to the reserve position which permits the tank to discharge the final contents, the reserve, thereof to the fuel pump and carburetor or carburetors of the vehicle. As a matter of fact, whether this system is used with or without a fuel gauge, there is a strong tendency for the operator of the vehicle to utilize the system as the sole means for determining when the tank should be filled, permitting the operation to proceed while the valve is in the normal position and filling the tank only when it is necessary to switch on the reserve. However, it occasionally happens that the operator will forget to return the valve from the reserve to the normal position after the tank has been filled, in which case, he will discover that the next time he runs out of gas, the reserve supply has been used and the supply tank is completely empty. Needless to say, this causes great inconvenience and to avoid such a mistake, the operator must habitually return the valve to the normal position after the tank is filled. It is therefore a primary object of this invention to provide means in the form of an attachment for vehicles of the type described which will automatically reset the control valve from the reserve to the normal position incident to the operation of filling the supply tank.

A further object of this invention is to provide a simple attachment of the character described which may be easily and conveniently fitted upon existing automobiles of the type under consideration.

Another object of this invention is to provide a novel attachment for automotive vehicles utilizing fuel systems of the character described in which the control valve is returned or reset from the reserve to the normal position incident to the operation of opening the filler cap to permit fuel to be placed in the supply tank.

Still another object of this invention is to provide a device of the character described including a novel mounting means for the filler cap of the supply tank wherein the cap when disposed in open position, forms an abutment preventing closure of the hood for the compartment containing the supply tank.

A further object of this invention is to provide an attachment of the character described including means for normally urging the filler cap to the open position wherein it will prevent closing of the hood of the supply tank compartment until such time as the gas station attendant has securely locked the filler cap in position on the tank in closing relation to the filler neck thereof, to obviate the possibility of the vehicle being operated while the filler cap is not closing the filler neck.

Still another object of this invention is to provide an attachment of the character described which may be readily and easily installed on present control valve systems without requiring alteration thereto or without interfering with the normal operation thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing the forward portion of a vehicle of the character described with the hood thereof open gaining access to the interior of the gas supply compartment and showing the filler cap in the open position;

FIGURE 2 is a transverse section showing the compartment of the vehicle containing the supply tank and illustrating the attachment operatively associated therewith and with the control valve of the fuel system being disposed in the reserve position;

FIGURE 3 is a view similar to FIGURE 2 but showing the filler cap in the raised position into which it is normally urged when the latch means associated therewith is released and illustrating the control valve after having been urged to the normal position;

FIGURE 4 is a view similar to FIGURES 2 and 3 but showing the position of parts immediately after the tank has been filled and the cap repositioned on the filler neck;

FIGURE 5 is an enlarged elevational view showing the manner in which the operating crank arm of the attachment is secured to the existing fuel valve control rod;

FIGURE 6 is an enlarged elevation of the actuated head of the Bowden wire operating between the filler cap and the control valve rod;

FIGURE 7 is an enlarged view, partly broken away, showing an end portion of the lever carrying the filler cap; and FIGURE 8 is an enlarged sectional view taken substantially along the plane of section line 8—8 of FIGURE 2 and illustrating the latch means for the filler cap.

Referring at this time more particularly to FIGURE 1, reference numeral 10 indicates in general the forward portion of a vehicle, a German import, presently in large demand and which has in the forward portion thereof a compartment containing a fuel tank and which compartment is provided with a swingable hood or cover 11 forming a cover for this compartment. The hood 11, as shown in FIGURE 1, is not in its fully open position but is in an intermediate position wherein it is blocked from further closing by the cap assembly indicated generally by the reference character 12 and which forms a part of this invention. The position of the hood in FIGURE 1 illustrates the manner in which the attachment, in addition to the advantage of controlling the fuel valve, prevents a gas station attendant from accidentally forgetting to replace the filler cap back on the filler neck of the fuel tank. This is a particularly undesirable situation in a vehicle of this type inasmuch as the fuel tank is contained within a compartment which is also utilized for storage purposes. If the fuel tank cap is left off the filler neck, not only is there the possibility that fuel will be spilled into the interior of the automobile so as to prevent a fire hazard, but also any contents of the storage compartment might well be damaged or destroyed by spilling gasoline.

In FIGURE 2, reference character 13 indicates a fender of the vehicle illustrated in FIGURE 1 whereas the wall portion or partition 14 represents a portion of the fender well within the confines of which the front wheels 14 are disposed. The fuel supply tank 15 which is conventional equipment with the vehicle, normally rests upon or is recessed into the bottom wall of the compartment within which it is contained, such bottom wall, for the purposes of clarity, not being illustrated in FIGURE 2. The tank is provided with an outlet pipe 16 and a valve 17 is included in the outlet which is controlled by a rod 18, see FIGURE 5, for selectively moving the valve to any one of a number of positions from the interior of the automobile. Actually, the control rod 18 or at least one end portion is contained within the passenger compartment of the vehicle and is provided with a handle portion 19 at its inner free end by means of which the operator of the vehicle may turn the rod and thus control the valve between the three positions usually provided for. These three positions are a shut-off position, a normal position and a reserve position.

In the particular type of vehicle to which specific reference is had in this application, the operation of the tank is such that the outlet pipe 16 extends upwardly within the confines of the tank 15 a predetermined distance and when the valve is in the normal position, the gasoline is picked up from the top of such standpipe so that when the level of the fuel falls below the top of this standpipe, while the valve is in the normal position, fuel cannot be picked up by the fuel pump of the engine. When this situation arises, the control valve is manually turned to the reserve position at which point the fuel is picked up at the bottom of the tank. There is sufficient fuel left in the tank when the reserve is turned on to operate the vehicle for quite a few miles permitting the operator to drive to a gas station for refilling the tank.

The tank is also provided with the usual filler neck 18' by means of which the tank is filled. The attachment forming this invention consists essentially of the aforementioned filler cap assembly indicated generally by the reference character 12 and a mounting means indicated generally by the reference character 19 for this filler cap and which is connected to a Bowden wire assembly indicated generally by the reference character 20 which is designed to control the fuel control valve 17 in a manner hereinafter set forth.

Reference numeral 21 indicates a component portion of the frame of the vehicle and which forms in part the bottom wall of the storage compartment within which the fuel tank is contained, the reference character 22 indicating a supporting flange extending from the tank 15 to overlie the frame portion 21 to effectively support the fuel tank. The Bowden wire assembly 20 projects through this frame component 21 in the manner shown and is provided with a rigid tubular upper end portion 23 which also extends through the lip 24 of a bracket 25 rigidly affixed to the inner surface of the partition wall 14 forming the fender well and which bracket 25 is so bent as to conform generally to the contour of this wall portion 14 as shown. The upper end of the bracket 25 includes a leg portion 26 at a right angularly bent stop portion 27, the purpose of which will be presently apparent. Reference numeral 28 indicates a portion of the body of the vehicle which forms the top of the storage compartment and against which the hood 11 is adapted to engage when the hood is in the fully closed position.

The previously mentioned rigid portion 23 of the Bowden wire assembly is secured as by nuts 29 and 30 to the lip 24 so as to be rigid therewith and the flexible inner member of the Bowden wire carries an actuating head indicated generally by the reference character 31 and as is shown most clearly in FIGURE 6.

In FIGURE 6, reference numeral 32 indicates the upper end of the Bowden wire which is provided with a threaded portion 33 upon which the base portion 34 of the actuating head 31 is threaded. The upper end of the actuating head has a transversely elongate portion 35 provided with a longitudinally extending slot 36 therein which is adapted to receive a cross pin element 37 carried by the lower end 38 of the gas cap lever 19, see particularly FIGURE 2.

The bracket 25 is provided with a pair of upstanding ears 40 between which is received an intermediate portion of the lever 19 and through which a pin 41 is projected so as to pivotally attach the lever 19 to the bracket 25. FIGURE 7 illustrates more clearly the construction of the lever 19 in the region of its pivotal connection to the ears 40 and in this connection, it will be seen that the intermediate portion of the lever 19 is provided with a boss 42 having a transverse bore 43 therethrough receiving the aforementioned pin 41 and that the end portion 38 of this lever is bifurcated as indicated by the reference character 44 so that the divided portions 45 and 46 thereof are adapted to straddle the actuating head 31 and with corresponding portions thereof being provided with transverse bores 47 receiving the aforementioned pin 37 in a manner which will be readily apparent.

On the upper side of the lever 19 is provided a tab 50 and a corresponding tab 51 is fixed to the crotch defined between the portions 26 and 27 of the bracket 25 and between these two tabs, which are apertured, extends a tension spring 52 which is stretched when the parts are in the position shown in FIGURE 2 so as to normally urge the lever 19 and the filler cap 12 carried thereby into the position shown in FIGURE 3. In this position of the parts, it will be noted that the stop portion 27 of the bracket engages a portion of the lever 19 and holds the same in a substantially vertical position, as shown in FIGURE 3.

The filler cap may be of any conventional or desired construction and one manner in which it can be constructed is illustrated in FIGURE 8. In this figure, the body of the cap 53 is provided with an annular flange portion 54 embracing the upper open end of the filler neck 18, the filler neck being provided with the usual interrupted flange portion 55 with which the rotatable bar 56 is adapted to cooperate to latch and unlatch the cap with respect to the filler neck. The bar 56 is rigid with the lower end of the stem 57 which projects upwardly through the top of the cap and is provided thereat with a crossbar 58 whereby the bar 56 may be turned internally of the filler neck 18 and in operative relationship with the interrupted flange 55 thereon to position the bar 56 such that it will slip through the interrupted portion of the flange 55 and permit removal of the cap. Beneath the crossbar 58 is an enlarged portion 59 which bears against the top of the cap cover portion 60 so that as the bar 56 is turned, the cap will be compressed into sealing engagement with the upper surface of the filler neck 18. For this purpose, the usual gasket construction may be employed in the cap assembly. The free end of the lever 19 is rigidly affixed to the cap as at 61, see particularly FIGURE 2, and it will be appreciated that as soon as the operating handle 58 is turned to release the cap from latched engagement with the filler neck, the spring 52 will urge the parts to the position illustrated in FIGURE 3. In this position of the component parts, it will be readily apparent that the flexible portion 63 of the Bowden wire assembly 20 will be moved to the left from the position shown in FIGURE 2 to the position shown in FIGURE 3 and will operate the actuating lever 64 in accordance therewith. For this purpose, the free end of the flexible Bowden wire 63 is provided with a stop collar 65 abutting the far side of the lateral projections 66 swivelly affixed to the lower end of the actuating lever 64. As shown in FIGURE 5, the upper end of the actuating lever 64 is disposed around the control rod 18 conventionally provided for controlling the valve 17 and is rigidly affixed thereto as by means of a setscrew 68 or the like. The lateral projection 66 is provided with a transverse bore 69 through which the flexible portion 63 of the Bowden wire is disposed and the reduced shank portion 70 thereof projects through a suitable aperture in the lower end of the lever 64 and is headed as at 71 to retain the projection on the lever but to permit swivelling action with respect thereto as the component parts are moved between the position as shown in FIGURES 2 and 3.

The position of the rod 18 and lever 64 as shown in FIGURE 2 represents the reserve position of the control valve whereas the position of the lever 64 and control rod 18 in FIGURES 3 and 4 illustrates the normal position of the valve for normal fuel pick-up and before the reservoir is tapped. Since the flexible portion 63 of the Bowden wire merely extends through the aperture 69 in the projection 66, it will readily be perceived that a lost motion connection is established therebetween which operate only upon movement of the Bowden wire from right to left in the FIGURES and will serve to position the lever 64 and consequently the control rod 18 from the reserve position to the normal position, effecting a resetting action on the control valve.

In the actual installation of the device, it will be appreciated that the Bowden wire and associated lever 64 are operatively connected to the existing control rod 18 so that whenever the gas cap 12 is disposed in closed position with respect to the filler neck 18', the control rod may be manipulated to actuate the valve 17 to the reserve position, without being interfered with by the Bowden wire assembly.

As shown in FIGURE 3, when the cap assembly 12 is disposed in the open position under the action of the spring 52, the same will be positioned under the lower edge 70 of one side of the hood 11 so as to prevent closing of the hood until the gas taken is positively locked back in place on the filler neck. This prevents accidental spillage of gasoline by a gas station attendant forgetting to replace the gas cap.

What is claimed as new is as follows:

1. In a vehicle having a compartment containing a fuel tank, and a swingable closure for gaining access to the interior of the compartment, a closure cap for the tank mounted in said compartment and movable between a position closing the tank and an open position permitting the tank to be filled with fuel, said tank having an outlet provided with a manually operable valve adapted to be operated from the exterior of the tank and from a remote position and movable between normal and reserve positions, means connecting said cap and said valve for resetting the valve from the reserve to the normal position when the cap is moved to the open position, said means comprising a bracket fixed within said compartment, a lever pivoted to said bracket and carrying said filler cap at one end, a motion-transmitting element connected to the opposite end of said lever and fastened to said valve by means of a lost motion connection for resetting the same.

2. In a vehicle having a compartment containing a fuel tank, and a swingable closure for gaining access to the interior of the compartment, a closure cap for the tank mounted in said compartment and movable between a position closing the tank and an open position permitting the tank to be filled with fuel, said tank having an outlet provided with a manually operable valve adapted to be operated from the exterior of the tank and from a remote position and movable between normal and reserve positions, means connecting said cap and said valve for resetting the valve from the reserve to the normal position when the cap is moved to the open position, said cap, when in the open position, preventing movement of said swingable closure to the closed position, said means comprising a bracket fixed within said compartment, a lever pivoted to said bracket and carrying said filler cap at one end, a flexible motion-transmitting element connected to the opposite end of said lever and fastened to said valve by means of a lost motion connection for resetting the same.

3. In a vehicle having a compartment containing a fuel tank, and a swingable closure for gaining access to the interior of the compartment, a closure cap for the tank mounted in said compartment and movable between a position closing the tank and an open position permitting the tank to be filled with fuel, said tank having an outlet provided with a manually operable valve adapted to be operated from the exterior of the tank and from a remote position and movable between normal and reserve positions, means connecting said cap and said valve for resetting the valve from the reserve to the normal position when the cap is moved to the open position, said means comprising a bracket fixed within said compartment, a lever pivoted to said bracket and carrying said filler cap at one end, a flexible motion-transmitting element connected to the opposite end of said lever and fastened to said valve by means of a lost motion connection for resetting the same, said bracket including a stop portion engaging said lever when the cap is in its open position to maintain the same in vertical position and in the path of movement of said closure.

4. In a vehicle having a compartment containing a fuel tank, and a swingable closure for gaining access to the interior of the compartment, a closure cap for the tank mounted in said compartment and movable between a position closing the tank and an open position permitting the tank to be filled with fuel, said tank having an outlet provided with a manually operable valve adapted to be operated from the exterior of the tank and from a remote position and movable between normal and reserve positions, lost motion means connecting said cap and said valve for resetting the valve from the reserve to the normal position when the cap is moved to the open position the subsequent replacement of the filler cap being ineffective to move said valve back to its original position, said cap, when in the open position, preventing movement of said swingable closure to the closed position, said cap including means for latching the same in closed position and its mounting including resilient means for urging the cap to the open position when said latch means is released, said connecting means comprising a bracket fixed within said compartment, a lever pivoted to said bracket and carrying said filler cap at one end, a flexible motion-transmitting element connected to the opposite end of said lever and fastened to said valve for resetting the same by means of a lost motion connection.

5. An attachment for motor vehicles of the type having a compartment provided with a swinging closure containing a fuel tank provided with an outlet including a manually operable valve adapted to be operated from the exterior of the tank and from a remote position and movable between normal and reserve positions and having a filler neck, a cap for the filler for swinging movement into and out of closed position with respect thereto, and means connecting said cap to said valve for resetting the valve from the reserve to the manual position when the cap is swung out of closed position with respect to the filler neck, said cap, when in the open position, preventing the closing of said swinging closure, said means comprising a bracket fixed within said compartment, a lever pivoted to said bracket and carrying said filler cap at one end, a flexible motion-transmitting element connected to the opposite end of said lever and fastened to said valve by means of a lost motion connection for resetting the same.

6. In combination with a fuel tank having an outlet provided with a manually operable valve adapted to be operated from the exterior of the tank and from a remote position and to switch to a reserve supply of fuel in the tank and an inlet provided with a filler cap, means connecting the filler cap to said valve for resetting the valve, said connecting means including lost motion means for one way movement of said valve out of the reserve position to the normal position when the cap is moved to the open position, said connecting means comprising a pivoted lever carrying said filler cap at one end, a flexible motion transmitting element connected to the opposite end of said lever extending to and connected by a lost motion connection with said valve to reset the same.

7. A fuel system for automotive vehicles comprising a tank having an outlet, a manually operable valve in said outlet adapted to be operated from the exterior of the tank and from a remote position and movable between a normal position connecting the outlet to the main body of fluid in the tank and a reserve position connecting the outlet to a reserve supply of fuel in the tank, said tank having a filler neck and a cap removably covering the neck, means operatively connecting said cap and said valve for resetting the valve, said connecting means including lost motion means for one way movement of said valve out of the reserve position to the normal position when said cap is removed, the subsequent replacement of the filler cap being ineffective to move said valve back to the reserve position, said connecting means comprising a pivoted lever carrying said filler cap at one end, a flexible motion transmitting element connected to the opposite end of said lever extending to and connected by a lost motion connection with said valve to reset the same.

8. An attachment for motor vehicles of the type having a fuel tank provided with an outlet including a manually operable valve adapted to be operated from the exterior of the tank and from a remote position and movable between normal and reserve positions and having a filler neck, a cap for the filler neck for swinging movement into and out of closed position with respect thereto, means operatively connecting said cap to said valve for resetting the valve, said connecting means including lost motion means for one way movement of said valve out of the reserve position to the normal position when said cap is swung out of the closed position with respect to the filler neck, the subsequent replacement of the filler cap being ineffective to move said valve back to the reserve position, said connecting means comprising a pivoted lever carrying said filler cap at one end, a flexible motion transmitting element connected to the opposite end of said lever and extending to and connected by a lost motion connection with said valve to reset the same.

References Cited in the file of this patent

UNITED STATES PATENTS

| | | |
|---|---|---|
| 965,634 | Judevine | July 26, 1910 |
| 1,410,104 | Lindsey | Mar. 21, 1922 |
| 1,440,520 | Young | Jan. 2, 1923 |
| 1,465,400 | Linck | Aug. 21, 1923 |
| 1,470,775 | Stephens | Oct. 16, 1923 |
| 1,660,835 | Folds | Feb. 28, 1928 |
| 2,035,895 | Kelly | Mar. 31, 1936 |
| 2,112,393 | Burch | Mar. 29, 1938 |
| 2,151,249 | Vidmar | Mar. 21, 1939 |
| 2,284,997 | Svendsen | June 2, 1942 |
| 2,663,447 | Westcott | Dec. 22, 1953 |
| 2,783,057 | Buck | Feb. 26, 1957 |